United States Patent [19]

Turpin

[11] Patent Number: 5,079,555
[45] Date of Patent: Jan. 7, 1992

[54] SEQUENTIAL IMAGE SYNTHESIZER

[75] Inventor: Terry M. Turpin, Columbia, Md.

[73] Assignee: Essex Corporation, Columbia, Md.

[21] Appl. No.: 604,255

[22] Filed: Oct. 29, 1990

[51] Int. Cl.[5] .................. G01S 13/90; G01S 3/00
[52] U.S. Cl. ........................ 342/25; 342/179; 364/822; 73/602
[58] Field of Search ................ 342/25, 179; 364/822; 73/608, 602

[56] References Cited

U.S. PATENT DOCUMENTS

| | | | |
|---|---|---|---|
| 3,909,827 | 9/1975 | Tricoles et al. | 342/179 |
| 4,225,938 | 9/1980 | Turpin | 364/822 |
| 4,365,310 | 12/1982 | Green | 364/822 |
| 4,707,697 | 11/1987 | Coulter et al. | 342/25 |
| 4,717,916 | 1/1988 | Adams et al. | 342/179 X |
| 4,881,079 | 11/1989 | Peregrim | 342/192 X |
| 4,888,724 | 12/1989 | Marom et al. | 342/25 X |

Primary Examiner—Gilberto Barron, Jr.
Attorney, Agent, or Firm—Spensley, Horn Jubas & Lubitz

[57] ABSTRACT

A method and apparatus for producing an image of a target area, by: at an observation location spaced from the target area, transmitting a beam of electromagnetic radiation toward the target area, and receiving reflections of the radiation from the target area; providing a representation of the magnitude and direction of the distance between points on the target area which produce reflections that travel in phase to the observation location; varying the spatial relation between the observation location and the target area and/or the given radiation frequency, in order to establish a plurality of different observation states which succeed one another in time, each state being associated with a distinct combination of magnitude and direction of the distance between points on the target area which produce reflections that travel in phase to the observation location; producing two coherent radiation beams, directing the two beams onto a receiving plane provided with an array of radiation receiving cells and storing output signals from each receiving cell, and controlling the two beams, for each observation state in succession, such that the two collimated beams have: beam axes which are inclined relative to one another by an angle corresponding in magnitude and direction to the magnitude and direction representations; a phase difference corresponding to the phase difference between the transmitted and received radiation; and intensities such that the product of the intensities of the two beams corresponds to the intensity product of the transmitted and received radiation.

20 Claims, 5 Drawing Sheets

SEQUENTIAL IMAGE SYNTHESIZER

BACKGROUND OF THE INVENTION

The present invention relates to image synthesis, and in particular to instruments that use back-projection methods to synthesize images and other outputs.

The present invention derives from a concept that enables more efficient construction of images from a series of measurements than can be achieved by devices based on previous methods. The present invention includes a family of devices based on these methods that are implemented in optical computing architectures.

The devices described herein are part of that family and constitute a set of Synthetic Aperture Radar ("SAR") processors. These devices achieve major improvements over existing optical or digital SAR processors. In particular, far greater resolutions for specific fields of view can be obtained than can be obtained by utilizing existing devices of equivalent size, weight and power consumption For example, a SAR processor in accordance with the present invention may take up no more than one-tenth (1/10) of a cubic foot. Existing digital processors take up about 200 cubic feet, while optical implementations take up over 400 cubic feet.

Furthermore, the optical computing architectures described herein eliminate a computation-intensive step in the image generation process that consumes significant digital computing resources in existing digital image synthesizing devices Existing digital computers would have to perform at the rate of tens of teraflops (trillions of floating point operations per second) to equal the performance of these processors.

BRIEF SUMMARY OF THE INVENTION

It is an object of the present invention to provide an imaging radar system which is capable of producing high resolution images, is compact and can be fabricated from relatively inexpensive components.

Another object of the invention is to provide a radar imaging system which, being structurally compact and light in weight, can be conveniently carried in a variety of vehicles, including space satellites and small aircraft.

A further object of the invention is to provide radar image data in a form which can easily be stored and/or transmitted to a remote image forming device.

The above and other objects are achieved, according to the present invention, by a radar system for producing an image of a target area, which system includes:

transmitting means for transmitting a beam of radiation having a given frequency and intensity toward the target area such that points in the plane of the target area at which the radiation has a given phase form concentric circular arcs;

receiving means for receiving reflections of the radiation from the target area and for measuring the amplitude of the received radiation and the phase difference between the transmitted radiation (delayed by the round-trip time to the center of the target area) and the received radiation;

position and frequency determination means for measuring the relative positions of the target center and the transmitter/receiver and for measuring the frequency of the transmitted radiation;

position variation means for varying the relative positions of the target center and the transmitter/receiver;

basis function generation means for generating sets of elementary basis functions which are output from the function generation means in the form of an optical radiation field;

controlling means for using the position and frequency values to generate a control signal that enables the basis function generating means to select a specific basis function;

optical radiation detection means composed of an array of receiving cells lying in a optical receiving plane that produce an electrical output data representative of the time integral of the radiation incident thereon;

data integration means that continues the detector integration process of the optical radiation detection means and extends the limited data storage capacity of the optical radiation detection means.

The invention is based on a concept that the target object can be described mathematically as a weighted sum of a complete set of orthonormal basis functions which are periodic in space. Physically, these functions can be assumed to represent real diffraction gratings from which electromagnetic radiation can be scattered. Scattering from these gratings is used to measure the contributions of the basis functions to the total target object. By summing these measured functions, an image of the target object is synthesized.

The invention utilizes a scattering system that relies on the principle of Bragg scattering to measure the parameters that determine the individual contributions of distinct basis functions. When the Bragg condition is met, it can be shown that scattering from individual gratings in the target object is obtained only when constructive interference occurs from successive lines of the grating. In this way, gratings of specific spatial frequency and position are directly sensed.

The image synthesis process may be implemented by an optical computer and a controlling device. The controller is fed by information from the scattering system and instructs the optical computer to project the image of particular basis functions, separately and sequentially on a two-dimensional array of photo-detectors. These photodetectors are read into storage devices where the individual functions are summed.

The use of an optical computer to generate images of the required basis functions provides the invention with the capability to synthesize images at extremely high speeds. Using typical optical computing elements, individual basis function images can be generated in about one nanosecond. Since summation of approximately one million basis functions are used to produce a good image, the entire image synthesis process can be completed in about 1 millisecond.

The basis functions are generated by means of the interference of two coherent light beams that are input into the computer as two point sources in a plane which travel at an angle with respect to one another. The relative distance and angular orientation of the point sources in the plane correspond to the spacing and orientation of the grating within the target object The product of the amplitudes of the two beams corresponds to the weight of the basis function in the mathematical expansion. The relative phase of the two beams corresponds to the relative phase of a grating with respect to a reference grating in the object. The relative separation of the light beams out of the plane corresponds to a selection of a new basis function set for handling different scattering geometries. By controlling these parameters with the information obtained from waves scattered by the target, any individual basis function can be generated.

An important aspect of the invention is that optical computing architectures can be used to synthesize images of individual basis functions. In general, there are a variety of optical architectures that can be used to generate the basis functions. Furthermore, a variety of different components can be used by these varying architectures to produce the same results. Without intending to limit the generality of the invention, many specific examples are offered in the following material.

DESCRIPTION OF THE PREFERRED EMBODIMENTS

Data Collection Geometry

Figure 1:
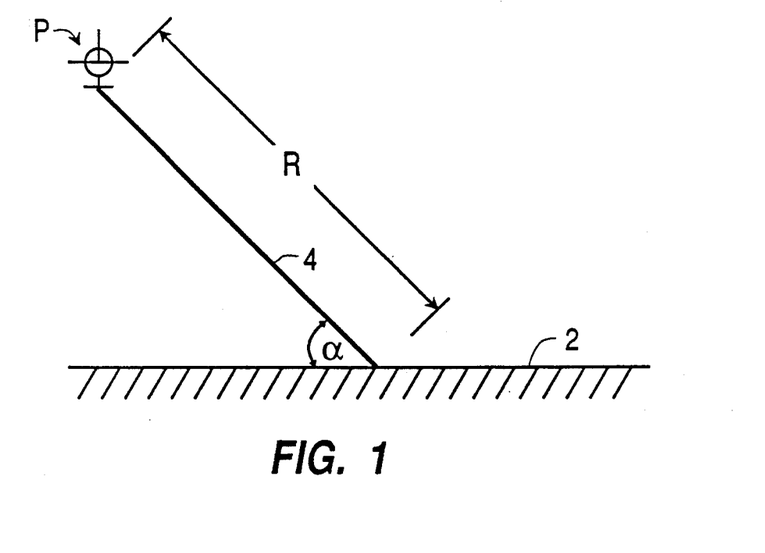
FIGS. 1-4 are pictorial diagrams illustrating certain principles employed by the present invention.

FIG. 1 is a simplified pictorial view illustrating the spatial relation between an airborne platform P carrying an image data gathering system according to the invention and a terrain surface 2 which is to be imaged. For this purpose coherent radiation is emitted in a propagation direction 4 toward a portion of surface 2 for which imaging data is to be obtained. Propagation direction 4 forms an angle $\alpha$ with the surface 2.

Figure 2:
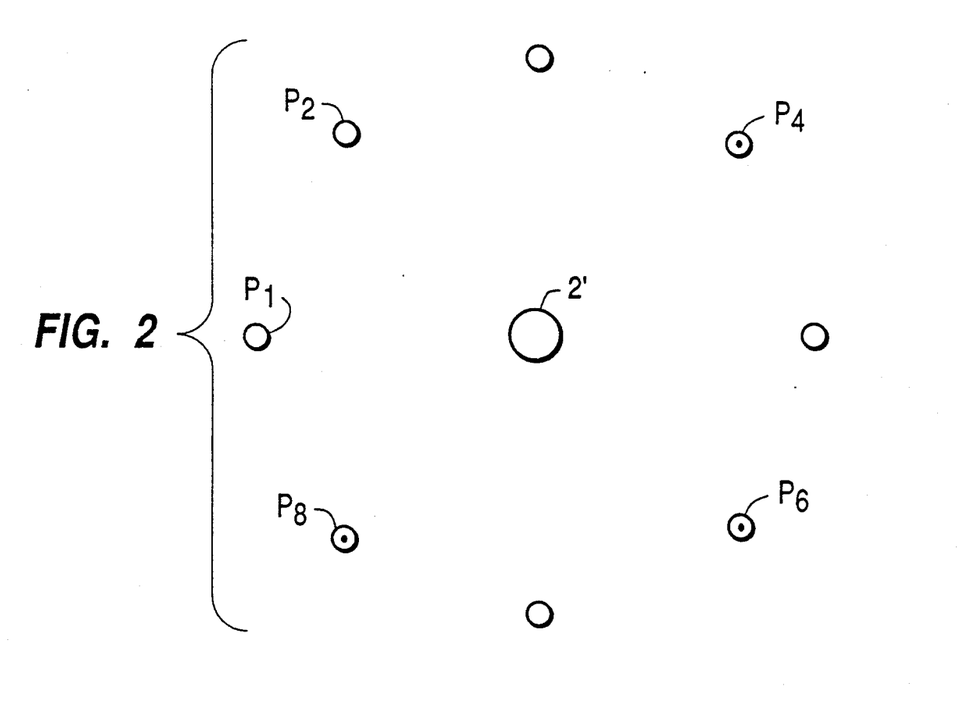

According to the present invention, imaging data for a given target region 2' on surface 2 are collected from a plurality of observation points extending around target region 2' by displacing platform P to each of points $P_1$, $P_2$, etc., in succession (See FIG. 2). The locus of points $P_1$, $P_2$ ... may completely surround region 2' or may be located to one side of that region. The locus of points $P_1$, $P_2$, ... may form a circle centered on region 2', but this is not essential.

In fact, for many applications, it will be desirable for points $P_1$, $P_2$ ... to lie along a straight line so that the vehicle carrying platform P can follow an intended flight path.

While eight observation points have been shown for the sake of illustration, it will generally be desired to perform thousands of observations at thousands of positions to produce the desired image accuracy.

Constructive Interference of Scattered Radiation

The development of radar images according to the present invention uses knowledge of the frequency of the transmitted radiation and scattering geometry to measure spatial frequencies of a terrain surface. The spatial frequency of the terrain surface is related to the wavelength emitted radiation by a constructive interference condition illustrated in FIGS. 3 and 4.

Figure 3:
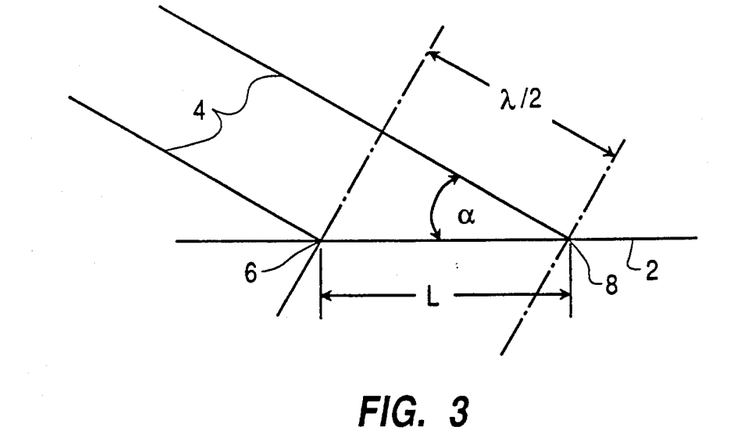

Referring to FIG. 3, radiation emitted from an airborne transmitter can be considered to have the form of wavefronts which remain parallel, or concentric, to one another and extend perpendicular to propagation direction 4.

If the emitted radiation is coherent and has a wavelength $\lambda$, and if points 6 and 8 on surface 2 lie on respective radiation wavefront lines that are $\lambda/2$ apart, radiation reflected from point 8 will travel back to the radar system in phase with radiation reflected from point 6. The distance L between points 6 and 8 is the spatial wavelength after terrain surface 2. The distance L is measured by detecting the constructive interference of related radiation of wavelength $\lambda$.

As can readily be determined from FIG. 3.

$$L = \frac{\lambda/2}{\cos \alpha}$$

where $\alpha$ is the angle between propagation directions 4 and surface 2.

Figure 4:
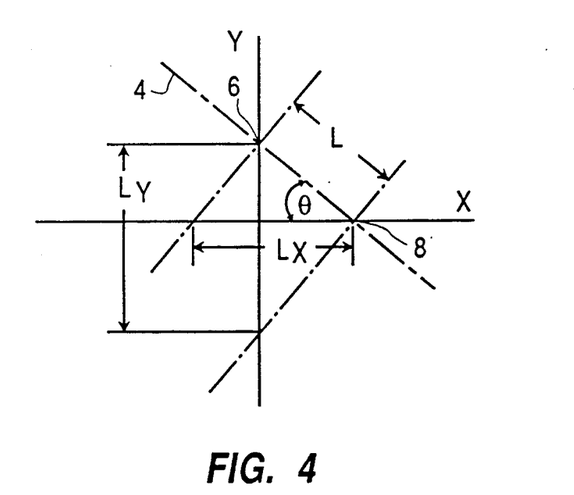

FIG. 4 is a top view of terrain surface 2 which can be viewed as a rectangular coordinate plane with ordinate y and abscissa x. Points 6 and 8 are shown with the reflected wavefronts and the corresponding spatial wavelength L.

It can easily be shown that if the angle which propagation direction 4 forms with abscissa x of coordinate system x,y is $\theta$, and c is the velocity of the radiation in air, then the effective spatial wavelength, $L_x$, along the x axis is $$L_x = \frac{L}{\cos \theta} = \frac{\lambda}{2 \cos \alpha \cos \theta} = \frac{c}{2f \cos \alpha \sin \theta}$$

and the effective spatial wavelength, $L_y$, along the y axis is $$L_y = \frac{L}{\sin \theta} = \frac{\lambda}{2 \cos \alpha \sin \theta} = \frac{c}{2f \cos \alpha \sin}$$

The corresponding spatial frequencies are:

$$f_x = \frac{1}{L_x} ; \text{ and } f_y = \frac{1}{L_y}$$

For every transmitted radiation wavelength, $\lambda$, and orientation of propagation ($\alpha$, $\theta$) there will be a particular set of values for $f_x$ and $f_y$.

Image Quality

According to the invention, a radar image is developed on the basis of data derived from a plurality of observations each performed at a respective observation point $P_i$. Observations are performed at a plurality of points and a plurality of observations can be performed at each point by varying the wavelength, $\lambda$, of the radiation emitted by the transmitter. At each observation point, different values for $\lambda$ will produce different sets of $f_x$, $f_y$ values, as indicated by the above equations. Typically, on the order of one million wavelength position observations are performed to obtain a satisfactory image.

The resolution of the resulting radar image depends on the range of ($f_x$ $f_y$) values. Consider a plane having the axes $f_x$, $f_y$. Image resolution depends on the area of this plane covered by points representing the $f_x$, $f_y$ pairs for which observations are performed. Preferably, these points are distributed uniformly across the plane.

To produce a good radar image, it is necessary to have at least a minimum variation in orientation of platform P relative to area 2'. Typically this would be achieved by moving platform P along a path which is laterally offset from area 2'. In certain circumstances, however, the necessary variation can be created by movement of the target area. For example the target may be a naval vessel whose movements produce sufficient variation or a planet being observed from a spacecraft.

The description presented above assumed linear wavefronts, which is an acceptable assumption when R, the relative distance between the platform and center of surface 2', is sufficiently large. However, the wavefronts can be treated more precisely as spherical surfaces for which suitable sets of $f_x$, $f_y$, values can be derived by a comparable geometric development, taking account of the magnitude of R.

Figure 5:
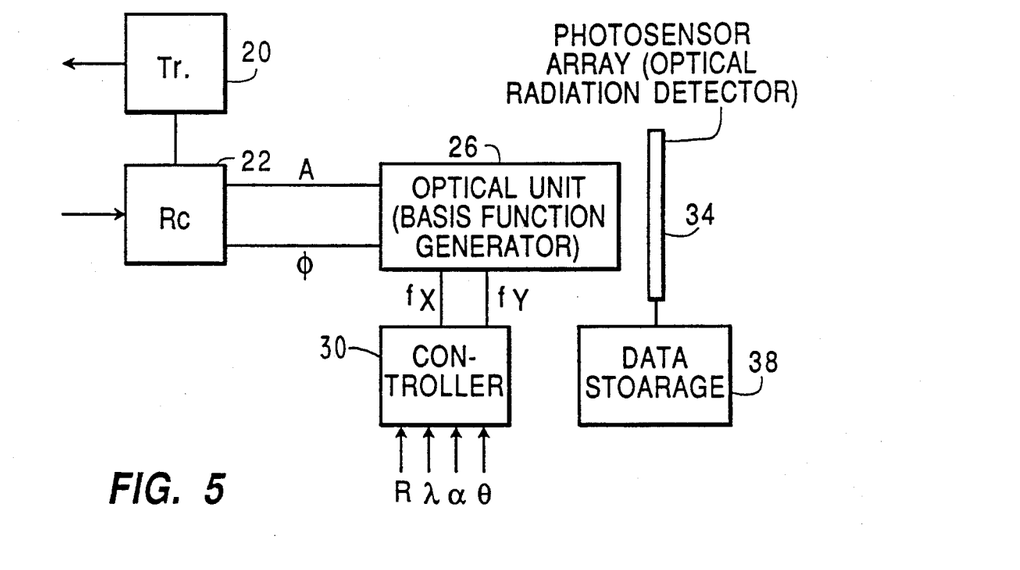
FIG. 5 is a block diagram of the basic components of an imaging system according to the present invention.

One exemplary system for implementing the invention is depicted in FIG. 5. The system includes a radar signal transceiver including a transmitter 20 and a receiver 22 carried by platform P (FIG. 1). At each position $P_1$, $P_2$..., transmitter 20 emits coherent radiation with wavelength $\lambda$.

Typically, this radiation will be formed by an antenna into a beam having a given shape and direction. Radiation reflected back to platform P will be received by receiver 22. Receiver 22 also receives a signal representative of the radiation emitted from transmitter 20. This latter signal is obtained from transmitter 20 and has a waveform identical to the transmitted radiation with a time delay equal to 2R/c, i.e. the time of radiation travel from transmitter 20 to the center of target region 2' and back to receiver 22.

These two signals are mixed to remove the time variation of the carrier frequency and to produce a signal that is proportional to the amplitude of the received signal and a function of the phase difference between the delayed transmission signal and the received signal. The extent of target region 2' can be controlled by appropriate shaping of the emitted radiation beam and selection, by time gating, of the portion of the mixed signal used to form the output signal.

The emitted radiation can be a short duration pulse, or can be continuous and the duration of the output signal can be controlled by time gating. The duration of the output signal should be chosen such that platform P is approximately stationary relative to region 2' between the beginning and end of that duration.

For the output signal at each observation point $P_1$, $P_2$, ..., there is derived a term, A, representative of the product, of the amplitudes of the transmitted and received radiation and a term $\phi$ representative of the difference in phase between the transmitted and received radiation.

If the emitted radiation has a sinusoidal waveform and platform P appears to be stationary for the duration, of the output signal, the received radiation and the mixed signal will also be sinusoidal.

For each observation point, values for A and $\phi$ are obtained from receiver 22 and sent to an optical unit 26. In addition, current values for $\alpha$ and $\theta$ are obtained from the position sensors associated with platform P and $\lambda$ is obtained from the transmitter. These values are then delivered to a controller 30. Controller 30 may then output values for $f_x$ and $f_y$ in accordance with the equations presented earlier herein.

Optical unit 26 serves as a two dimensional pattern generator implementing, for example, Fourier or Fresnel transforms, and supplies a spatial frequency pattern to a photosensor array 34 located at an image focal plane of unit 26. The patterns applied to array 34 for all observation points are summed, for example in data storage 38, to form a radar image of region 2'. It is also possible to sum a number of patterns in array 34 and then transfer the sum to data storage 38. The accuracy of the resulting image depends on the number of $f_x$ and $f_y$ observation points employed.

It will be noted that for each observation point only four (or possibly five, as will be discussed below) data values are produced. These values could easily be stored or transmitted, in digital form, for image reconstruction at a later time and/or at a remote location. However, all components required for image reconstruction can be contained in a single unit of less than one-tenth (1/10) of a cubic foot, in addition to the radiation transmitter and receiver.

Figure 6:
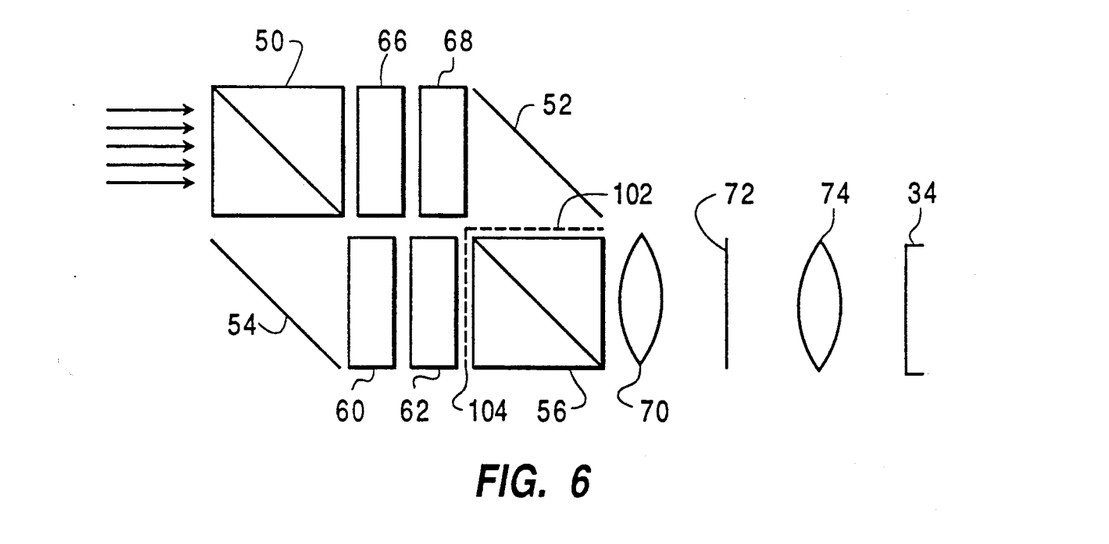
FIG. 6 is a simplified side elevational view of one embodiment of an optical unit employed in the system of FIG. 5.

One suitable embodiment of an optical unit according to the invention is illustrated in FIG. 6. This embodiment includes a first beam splitter 50 constructed and arranged to divide light coming from the left into a first component which continues in the original direction and a second component which is reflected downwardly. If light coming from the left is traveling horizontally, the first component will impinge on a mirror 52 while the second component will be reflected through an angle of 90° to a mirror 54 which reflects that component again through an angle of 90° back to a horizontal orientation.

The first component is reflected by mirror 52 through an angel of 90° and travels vertically downwardly to a reflecting surface of a second beam splitter 56. The second component travels from mirror 54 and through beam splitter 56 so that the two components travel together, to the right, from splitter 56 and through a lens system.

In accordance with the invention, the light directed to splitter 50 is a wide, collimated coherent beam having a horizontal beam axis. After the beam is split into two components, each of the following operations is performed on at least one or the other of the two components: deflection transverse to the beam axis; intensity control; and a phase shift. Each of these operations can be performed on either component or can be divided between the two components.

In the exemplary embodiment shown in FIG. 6, deflection is performed by an x-axis electro-optic deflector 60 and a y-axis electro-optic deflector 62, phase shifting is performed by an optical phase modulator 66 and intensity control is affected by an optical amplitude modulator 68. Modulators 66 and 68 are electrically controlled.

The optical system described thus far produces two broad collimated component beams whose axes are inclined to one another by an amount determined by deflectors 60 and 62 and which differ from one another in intensity and phase as determined by modulator 66 and 68.

These beams pass through a first converging lens 70 which, in effect, performs a first Fourier transform and focuses each component beam at a respective point on a transform plane 72, which need not be a physical body. The distance between the two points on surface 72 corresponds to the deflections produced by deflectors 60 and 62. Thus, at plane 72 there are two point sources of coherent light.

Plane 72 is at the focal plane of a second converging lens 74 which converts light from the two points into broad collimated beams which intersect an image plane containing the array 34 of time integrating photosensors. The angle between the axes of the two beams is proportional to the spacing between the two point sources in plane 72.

The light falling on array 34 is an interference pattern of the two point sources in plane 72. The pattern has a spatial frequency with a direction corresponding to the direction of a line connecting the two point sources in plane 72 and a spatial frequency value proportional to the spacing between those points. The phase of the spatial frequency is proportional to the difference in phase between the two point sources. The amplitude of the light forming the pattern is proportional to the product of the intensities of the two point sources.

According to the invention, this interference pattern is caused to illuminate array 34 for a given time period, during which time the light intensity at each photosensor element is integrated, and the integrated values, i.e. the charge on each photosensor element, are transferred to storage 38.

This process is then repeated for each set of $f_x$, $f_y$ values, the integrated light intensity values for each respective photosensor element being added together in storage 38.

In further accordance with the invention, parts 34, 56, 70 and 74 are arranged so that a plane passing through the middle of splitter 56 and oriented parallel to plane 72 is imaged on array 34.

Figure 7:
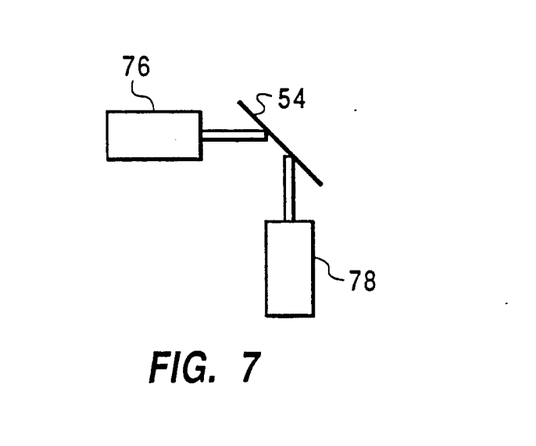
FIG. 7 is a side elevational view of an alternate version of a portion of the unit of FIG. 6.

According to another embodiment of the invention, a portion of the optical unit shown in FIG. 6 is modified, as shown in FIG. 7, by replacing deflectors 60 and 62 by x and y drivers 76 and 78 which are connected to mirror 54 to pivot mirror 54 in a manner to produce the desired beam deflection. Drivers 76 and 78 are electrically driven by the $f_x$ and $f_y$ signals.

In the optical units of FIGS. 6 and 7, the beam component which is subject to transverse deflection has a wavefront w(x,y) given by:

$$w(x,y) = a e^{2j\pi(f_x x + f_y y)}$$

where a is a constant and x and y are the coordinates of resulting spot in plane 72.

The other beam component has a wavefront s(x,y) given by $$s(x,y) = b(f_x, f_y) e^{j2\pi \phi(f_x, f_y)}$$

where b and $\phi$ are the amplitude and phase values applied to modulators 66 and 68.

The two beam components are summed on photosensor array 34 which responds to optical power, i.e. the square of the sum of w and s, to produce the sum signal pattern P(x,y), where $$P(x,y) = a^2 + b(f_x, f_y)^2 + 2ab(f_x, f_y) \cos(2\pi(f_x x + f_y y + \phi(f_x, f_y)))$$

The third term of P(x,y) is the cosine spatial frequency ($f_x$, $f_y$) with the proper amplitude and phase.

Data storage 38 sums the P(x,y) values for all $f_x$, $f_y$ sets.

A further optical unit which can be employed in the practice of the present invention utilizes acousto-optic (a-o) cells which deflect coherent light beams on the basis of a time varying function which is proportional to the associated spatial frequency $f_x$ or $f_y$.

Figure 8:
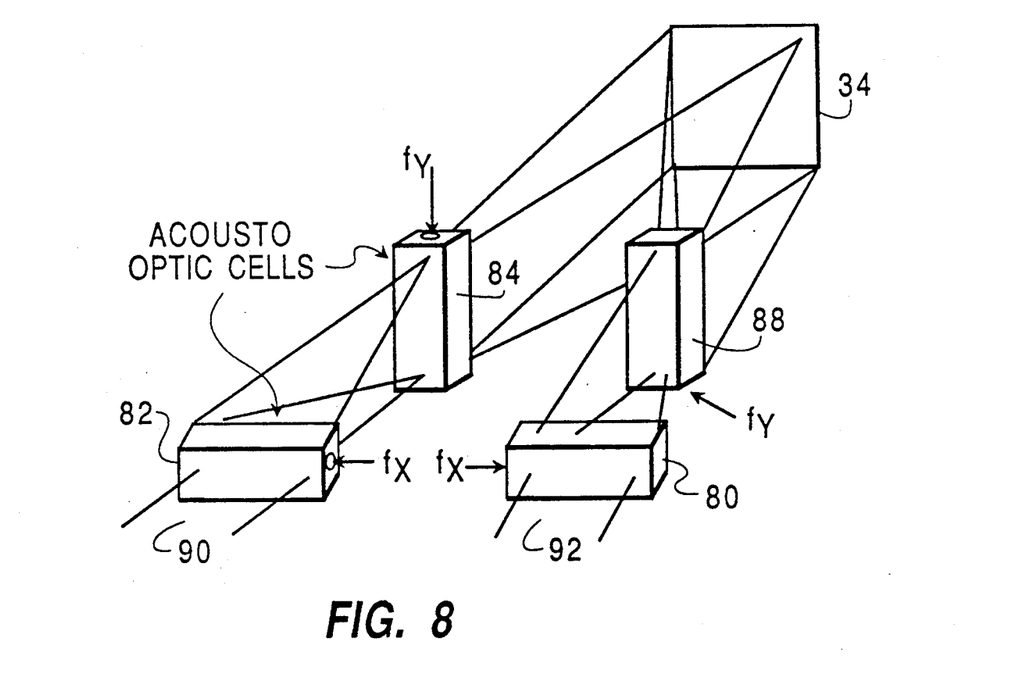
FIG. 8 is a perspective view of another embodiment of an optical unit employed in the system of FIG. 5.

One embodiment of an optical unit of this type is shown in FIG. 8 and includes two a-o cells 82, 84 defining a first optical path, two a-o cells 86, 88 defining a second optical path, photosensor array 34, and lens components (shown in FIGS. 9 and 10) for imaging the cells onto array 34.

A first coherent light beam 90 is directed to an input surface of cell 82 and is deflected horizontally by an alternating deflection signal $f(t)_x$ at a frequency proportional to $f_x$. The deflected beam is then shaped into a vertically widened beam applied to an input surface of cell 84. In cell 84 the beam is deflected vertically by a second alternating deflection signal $f(t)_y$ at a frequency proportional to $f_y$.

A second beam 92 is deflected horizontally by cell 86, shaped and deflected vertically by cell 88, all in a manner similar to that described above with respect to beam 90.

The resulting light patterns impinge on array 34 where the resulting interference pattern is temporarily stored before being transferred to the associated storage device.

Cells 82 and 86 have the same diffraction order, as do cells 84 and 88. This serves to cancel the Doppler frequency shifts from the cell gratings The deflection directions of cells 82 and 84 are opposite those of cells 86 and 88, respectively so that the combined effect of deflections of the two beams 90 and 92 is additive.

The optical field at output plane 34 is represented by:

$$A[f(t)_x, f(t)_y, t] = e^{j2\pi[(t+f(t)_x + \alpha)x + (t+f(t)_y + \beta)y]} + e^{-j2\pi[(f(t)_x + \alpha - t)x + (f(-t)_y + \beta - t)y]}$$

In the above equation, $f(t)_x$ and $f(t)_y$ are the frequencies applied to the cells, t is time, $\alpha$ and $\beta$ are mirror offsets to produce a spatial carrier, if desired. The optical power in the output plane is $$P[f(t)_x, f(t)_y] = A[f(t)_x, f(t)_y, t] A^*[f(t)_x, f(t)_y, t]$$

The time dependence is eliminated because both terms of A the same a-o diffraction order. Thus, the power in the output plane is $$P[f(t)_x, f(t)_y] = 2 + 2\cos[4\pi((f(t)_x + \alpha)x + (f(t)_y + \beta)y)]$$

This has a spatial frequency that changes with $f_x$, $f_y$ and is offset by $\alpha$, $\beta$.

The phase of the spatial frequency pattern is controlled by the relative phase of the cell inputs; the amplitude can be controlled by controlling the amplitude of the inputs to any combination of cells.

Derivation of values for $f_x$ and $f_y$ can take into account the curvature of the emitted radiation wavefronts on target region 2'. This will provide full correction of image distortions due to such curvature and is sufficient to produce accurate images when R is relatively small.

In situations where R has a comparatively small value, image accuracy can be improved by shifting the plane at which each beam component is brought to a focus in optical unit 26 by an amount proportional to 1/R.

This may be achieved, in the optical unit of FIG. 6, or FIG. 7, by providing a zoom lens ahead of beam splitter 50, or by moving lens 70 along the beam axis to move plane 72 either toward or away from array 34, and by controlling the lens on the basis of a signal proportional to 1/R, as indicated in FIG. 5. This requires that a signal representative of R be supplied to controller 30 of FIG. 5, possibly from a separate range measuring radar system.

Alternatively, in certain cases it may be desirable to shift the focal planes associated with the two beams in respectively opposite directions as a function of 1/R. This may be achieved by providing two controllable defocussing elements 102 and 104, shown schematically in FIG. 6.

Figure 9:
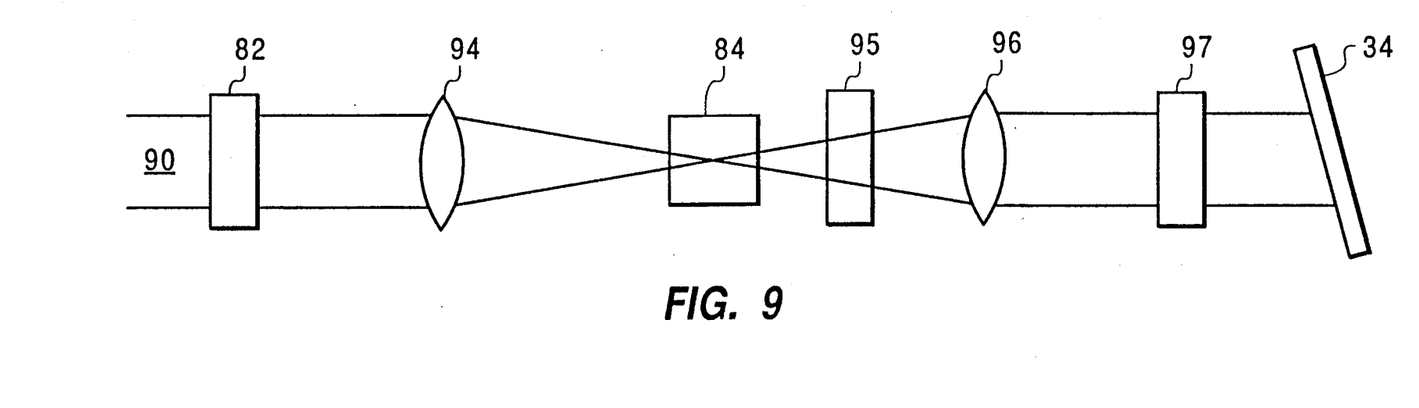
FIGS. 9 and 10 are, respectively, a plan view and a side elevational view of one part of the unit of FIG. 8.
Figure 10:
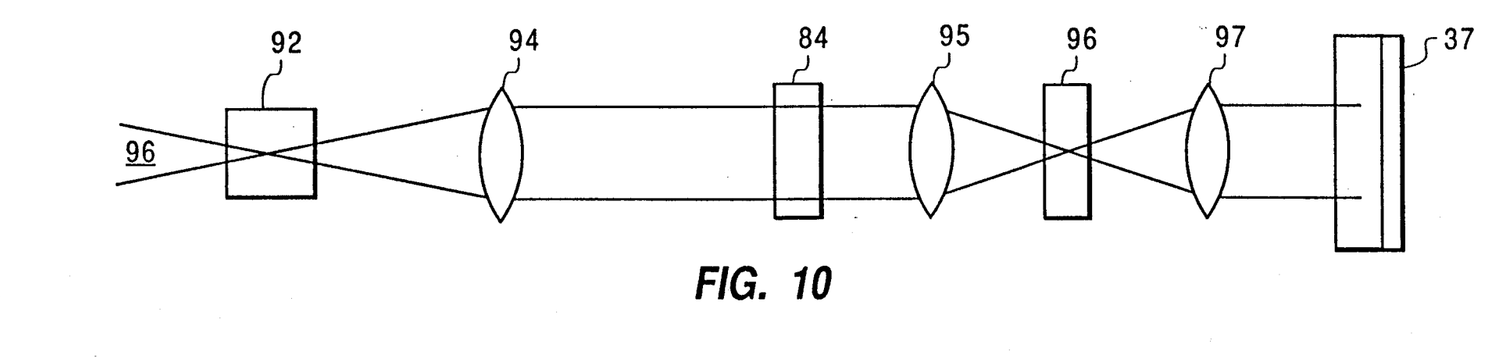

In the embodiment shown in FIGS. 8–10, appropriate defocussing could be performed by similar devices disposed ahead of cells 82 and 86.

Reverting to FIG. 8, each cell 82, 84, 86, 88 may be a Bragg cell, one suitable commercially available type being the Model No. 4050-1 Signal Processing Bragg cell marketed by Crystal Technology, Palo Alto, Calif.

One embodiment of a complete optical system for one of the two beams of the acousto-optic implementation of FIG. 8 is shown in a top view in FIG. 9 and in a side elevational view in FIG. 10. In this embodiment, a spherical converging lens 94 is disposed between cells 82 and 84 and an optical system composed of three cylindrical lenses 95, 96 and 97, spaced apart along the light beam path, is disposed between cell 84 and photosensor array 34.

The light beam 90 applied to cell 82 has a wedge shape in that is has the form of a wide, collimated beam in the X direction and the form of a converging beam, which is brought to a focus in cell 82, in the y direction. The light beam is deflected in cell 82 in the x direction by an angular amount proportional to the instantaneous magnitude of the signal $f(t)_x$.

The light beam is then acted on by lens 94 to converge in the x direction to a focal point in cell 84, while being given a collimated form in the y direction.

In cell 84 the light beam is deflected in the y direction by an angular amount proportional to the instantaneous magnitude of the signal $f(t)_y$.

Then, in the y direction the beam is converged by lens 95 and recollimated by lens 97 and in the x direction the beam is collimated by lens 96.

The collimated beam reaching photosensor array 34 is a coherent beam having a wavefront whose inclination in the x and y directions is a function of the instantaneous magnitude of the signals $f(t)_x$ and $f(t)_y$. The inclination of beam 92 (FIG. 8) is in mirror symmetry with that of beam 90 about a center point.

To create the relationships described above, lens 94 can have a focal length of 2f and be spaced from each of cells 82 and 84 by a distance of 2f, while each of lenses 5, 96 and 97 can have a focal length of f in its plane of curvature with a mutual spacing of f between cell 84, lenses 5, 96 and 97 and photosensor array 34.

The illustrated optical system is arranged to image each of cells 82 and 84 substantially in the plane of array 34.

Array 34 is shown with an inclination because each of the beam paths shown in FIG. 8 must be angularly offset from the normal to the plane of array 34.

In general terms, the purpose of an optical unit according to this invention is to produce two-dimensional spatial frequencies of controllable wavelength, direction (or inclination) and phase. These spatial frequencies could be produced in one dimension, e.g. with a pair of a–o cells, and rotated with a dove prism or an electrooptic rotator. A single a–o cell could be used and could be subjected to interference with an image of itself.

The spatial frequency representations are applied to a storage unit, including a two-dimensional photosensor array, which affects a time integration of all of the separately produced spatial frequency representations.

While the optically-based processors, described herein, are presented in a SAR context, similar optical processors can be based on this invention. These include but are not limited to: inverse synthetic aperture radar ("ISAR"), range Doppler imaging, and LASER imaging detection and ranging ("LIDAR"); ultra-sonic and other acoustic imaging used in medicine such as time-sequential acoustic holography and seismology, sonar, industrial testing and other fields; tomography applications such as magnetic resonance imaging ("MRI"), computerized axial tomography ("CAT"), positron emission tomography ("PET") and single photon emission computerized tomography ("SPECT"); and applications based on other particles or radiation such as x-ray diffraction, and electrons, neutron, proton or ultra-violet scattering.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A radar system for producing an image of a target area, comprising:
    transmitting means for transmitting a beam of radiation having a frequency and intensity toward the target area such that points in the plane of the target area at which the radiation has equal phase form a plurality of concentric arcs;
    receiving means for receiving reflections of the radiation from the target area and for measuring the amplitude of the received radiation and the phase difference between the transmitted radiation and the received radiation;
    position and frequency determination means for measuring the relative positions of the target center and the transmitter/receiver and for measuring the frequency of the transmitted radiation;
    position variation means for varying the relative positions of the target center and the transmitter/receiver;
    basis function generation means for generating sets of elementary basis functions which are output from the basis function generation means in the form of an optical radiation field;
    controlling means for using the position and frequency values to generate a control signal that enables the basis function generating means to select a specific basis function;
    optical radiation detection means composed of an array of receiving cells lying in a optical receiving plane that produce an electrical output data representative of the time integral of the radiation incident thereon;

data integration means that continues the detector integration process of the optical radiation detection means and extends the limited data storage capacity of the optical radiation detection means.

2. A system as defined in claim 1 wherein the beam of radiation on the target defines a spatial frequency vector having a plurality of components and wherein the output produced by the controller means is composed of two components of the spatial frequency vector; and the basis function generating means comprise beam generation means for generating at least two beams and two beam deflectors each positioned for deflecting a respective one of the at least two beams in a respective one of two perpendicular directions parallel to the receiving plane by an angular amount proportional to a respective component of the output produced by the controller means.

3. A system as defined in claim 2 wherein the at least two beams are coherent beams and wherein the basis function generation means further comprise a phase modulator disposed for phase shifting one of the two coherent beams by an amount proportional to the difference in phase between the transmitted and received radiation, and a radiation intensity modulator disposed for adjusting the intensity of one of the two coherent beams in accordance with the product of the intensity of the transmitted and received radiation.

4. A system as defined in claim 3 wherein the basis function generation means further comprise optical means for causing the beams to be collimated when they are incident on the receiving plane.

5. A system as defined in claim 4 wherein the optical means are controllable for causing at least one coherent beam to be decollimated when it is incident on the receiving plane, and further comprising beam control means connected for controlling the optical means to cause the degree of decollimation of the at least one beam to be inversely proportional to the distance between the transceiver means and the target area.

6. A system as defined in claim 1 wherein the basis function generation means comprise at least one acousto-optic modulator.

7. A system as defined in claim 6 wherein the beam of radiation on the target defines a spatial frequency vector having a plurality of components and wherein the output produced by the controlling means is composed of two components of the spatial frequency vector, and the basis function generating means comprise beam generating means for generating at least two beams and two pairs of the acousto-optic modulators, each pair being disposed for controlling a respective one of the two beams and each modulator of each pair being operative for deflecting its respective beam in a respective one of two perpendicular directions parallel to the receiving plane at a frequency proportional to a respective component of the representation produced by the controller means.

8. A system as defined in claim 7 wherein the modulators are controlled so that the modulators of one pair deflect their associated beam in directions opposite to those of the modulators of the other pair.

9. A system as defined in claim 7 wherein the basis function generation means comprise optical means for causing the beams to be collimated when they are incident on the receiving plane.

10. A system as defined in claim 11 wherein the optical means are controllable for causing each beam to be decollimated when it is incident on the receiving plane, and further comprising beam control means connected for controlling the optical means to cause the degree of decollimation of at least one beam to be a function of the distance between the transceiver means and the target area.

11. A system as defined in claim 1 wherein the transmitting and receiving means are carried by an aircraft or a spacecraft.

12. A system as defined in claim 1, wherein the beam of radiation on the target defines a spatial frequency vector having a plurality of components and wherein the output produced by the controller means is composed of two components of the spatial frequency vector; and the basis function generating means comprise beam generation means for generating at least two beams and two electro-mechanical beam deflectors each positioned for deflecting a respective one of the at least two beams in a respective one of two perpendicular directions parallel to the receiving plane by an angular amount proportional to a respective component of the output produced by the controller means.

13. A method for producing an image of a target area, comprising
at an observation location spaced from the target area, transmitting a beam of electromagnetic radiation having a given frequency and intensity toward the target area such that points on the target area at which the radiation has a given phase form concentric circular arcs, receiving reflections of the radiation from the target area and producing representations of the difference in phase between the transmitted and received radiation and the product of the intensity of the transmitted and received radiation;
providing a representation of the magnitude and direction of the distance between points on the target area which produce reflections that travel in phase to the observation location;
providing an array of receiving cells lying in a receiving plane, each cell being operative to produce an electrical signal representative of the intensity of radiation incident thereon;
varying one of:
the spatial relation between the observation location and the target area;
and the given radiation frequency, in order to establish a plurality of different observation states which succeed one another in time, each state being associated with a distinct combination of magnitude and direction of the distance between points on the target area which produce reflections that travel in phase to the observation location;
producing, in response to the representations of the difference in phase between the transmitted and received radiation, the product of the intensity of the transmitted and received radiation, and the magnitude and direction of the distance between points on the target area which produce reflections that travel in phase to the observation location, two coherent radiation beams, directing the two coherent beams onto the receiving plane, and controlling the two coherent beams, for each observation state in succession, such that the two collimated beams have:

beam axes which are inclined relative to one another by an angle corresponding in magnitude and direction to the magnitude and direction representations;

a phase difference corresponding to the phase difference representation;

and intensities such that the product of the intensities of the two beams corresponds to the intensity product representation; and storing the electrical signals produced by each receiving cell in a storage member.

14. A method as defined in claim 13 wherein: the magnitude and direction representation is composed of two components each representative of a respective vector component of the representation; and the step of controlling the two coherent beams comprises deflecting each coherent beam in two mutually perpendicular directions parallel to the receiving plane, deflection in each direction being by an angular amount proportional to a respective vector component of the magnitude and direction representation.

15. A method as defined in claim 13 further comprising: causing at least one of the coherent beams to be decollimated when it is incident on the receiving plane by an amount inversely proportional to the distance between the observation location and the target area.

16. A method as defined in claim 13 wherein: the magnitude and direction representation is composed of two components each representative of a respective vector component of the representation; the step of directing the two coherent beams is performed by passing each coherent beam through a respective pair of acousto-optic modulators; and the step of controlling the two coherent beams comprises deflecting each coherent beam in two mutually perpendicular directions parallel to the receiving plane, deflection in each direction being at a frequency proportional to a respective vector component of the magnitude and direction representation.

17. A method as defined in claim 16 wherein each acousto-optic modulator is a Bragg cell and all of the Bragg cells have the same diffraction order.

18. A method as defined in claim 17 wherein the step of controlling the two coherent beams is performed so that the modulators of one pair deflect their associated beam in directions opposite to those of modulators of the other pair.

19. A system as defined in claim 1 wherein the basis function generation means comprise at least one electro-optic modulator.

20. A system as defined in claim 1 wherein the basis function generation means comprise at least one electro-mechanical modulator.

* * * * *